United States Patent
Damavandi et al.

(10) Patent No.: US 9,678,920 B1
(45) Date of Patent: Jun. 13, 2017

(54) SELF-CALIBRATION AND COMPENSATION OF DETECTOR OFFSET IN GSM TRANSCEIVERS POWER CONTROL LOOP

(71) Applicant: Marvell International Ltd., Hamilton (BM)

(72) Inventors: Nader Damavandi, Irvine, CA (US); Ilan Meltser, Petach-Tikva (IL); Alexander Zaslavsky, Petach-Tikva (IL); Anish Cherian, Aliso Viejo, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 972 days.

(21) Appl. No.: 13/857,112

(22) Filed: Apr. 4, 2013

Related U.S. Application Data

(60) Provisional application No. 61/620,076, filed on Apr. 4, 2012.

(51) Int. Cl.
  *G06F 15/00* (2006.01)
  *H04B 17/19* (2015.01)
  *H04B 17/11* (2015.01)
  *H04B 17/21* (2015.01)

(52) U.S. Cl.
  CPC .............. *G06F 15/00* (2013.01); *H04B 17/11* (2015.01); *H04B 17/19* (2015.01); *H04B 17/21* (2015.01)

(58) Field of Classification Search
  CPC ....................................................... G06F 15/00
  USPC .............................. 702/189; 379/68; 324/357
  See application file for complete search history.

(56) References Cited

U.S. PATENT DOCUMENTS

| | | | | |
|---|---|---|---|---|
| 4,726,051 A | * | 2/1988 | Schuermann | H04M 1/73 379/68 |
| 6,414,511 B1 | * | 7/2002 | Janssen | G01R 31/3004 324/357 |
| 2009/0052575 A1 | * | 2/2009 | Waheed | H04L 27/368 375/297 |
| 2010/0027596 A1 | * | 2/2010 | Bellaouar | H03G 3/3047 375/219 |
| 2011/0021237 A1 | * | 1/2011 | He | H04W 52/52 455/522 |
| 2012/0071125 A1 | * | 3/2012 | Eken | G01R 19/04 455/226.2 |
| 2012/0306572 A1 | * | 12/2012 | Hietala | H03F 1/32 330/131 |

OTHER PUBLICATIONS

Global System for Mobile Communications, "3rd Generation Partnership Project; Technical Specification Group GSM/EDGE Radio Access Network; Radio transmission and reception", May 2009, pp. 1-185, vol. 8, 3GPP Organizational Partners, Valbonne, France.

"General Tests, Verification of support and non-support of services (multiple numbering scheme or ISDN)", Dec. 2008, pp. 123-284, vol. 7, 3GPP Organizational Partners, Valbonne, France.

\* cited by examiner

*Primary Examiner* — Gregory J Toatley
*Assistant Examiner* — Terence Stifter, Jr.

(57) ABSTRACT

A method for performing self-calibration and compensation of a detector offset is provided. The method includes: detecting for a calibration flag; if the calibration flag is detected, transmitting a first signal; reading and accumulating detector codes in response to the first signal; and calculating a detector offset based on the detector codes.

20 Claims, 6 Drawing Sheets

SELF-CALIBRATION AND COMPENSATION OF DETECTOR OFFSET IN GSM TRANSCEIVERS POWER CONTROL LOOP

CROSS REFERENCE TO RELATED APPLICATIONS

This application claims the benefit of and priority to U.S. Provisional Application 61/620,076, filed 4 Apr. 2012.

U.S. Provisional Application 61/620,076 is hereby fully incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In wireless communication technology, transceivers are used in various applications such as, for example, cellular telephones, cordless telephones, pagers, global positioning systems, and other applications. A transceiver chip typically includes a transmitter and receiver for performing the wireless communication functions.

Transmitter power control in a wireless transceiver is performed in either the open loop (OL) approach or the closed loop (CL) approach. An advantage of the CL approach over the OL approach is that the frequency, temperature, battery, and load variations are regulated by the closed loop and are compensated autonomously by the Radio Frequency Integrated Circuit (RFIC) by use of a compensation algorithm that relies on fixed predefined parameters. Base-Band Integrated Circuit (BBIC) resources may or may not be used for performing the compensation based on these fixed predefined parameters.

One of the lower cost approaches for closed loop power control is the use of a linear envelope detector for sampling the Power Amplifier (PA) output power. The feedback path in the closed loop power control approach typically includes this linear envelope detector and an analog-to-digital converter (ADC).

Proper calibration is important for this feedback path in the closed loop power control across a dynamic range of conditions and/or extreme conditions affecting the transceiver. In wireless communication standards with time division multiple access (TDMA), such as GSM (Global System Mobile Communications), the Radio Frequency (RF) output power at the PA output should meet the tight Power versus Time (PvT) transmit mask under various conditions. In general, inaccuracies in the feedback path calibration will typically impact the PvT transmit mask. Such degraded functions lead to customer dissatisfaction of their wireless devices. Additionally, inaccuracies in the feedback path calibration can also negatively impact other RF performances such as, for example, power accuracy and switching transient Output Radio Frequency Spectrum (ORFS).

The power control loop calibrations for wireless phones are performed during the production for each phone in the factory. These factory calibrations are usually complex, time consuming, and costly. One of the parameters of the power control loop that is calibrated for each phone is the Power Detector (PD) offset voltage. This PD offset voltage will shift up or down due to variations such as, temperature, power, frequency, and/or component aging. PD offset calibration (e.g., factory calibration or fixed-parameters used in present compensation algorithms) of the transceiver is used to compensate for the PD offset voltage. Any inaccuracy in PD offset calibration will cause several degradations including the increased output power inaccuracy especially at low power, PVT failures due to loop gain variations, and distortion of the compensation models or algorithms maintained in the BBIC Automatic Power Control (APC) structure.

The input/output (I/O) characteristics of the digitizer in the feedback loop may also shift up and/or shift down, depending on temperature (e.g., of the phone). Therefore, this variation is not properly calibrated and contributes to degradations (such as increased output power inaccuracy) that affect the performance of the transceiver.

In the case of linear envelope detectors, an accurate feedback path calibration is important at low power.

Additionally, the calibrations of the PD offset voltage across different extreme conditions are usually performed inside the BBIC using device characterization mathematical models. Some device part-to-part variations of the PD offset across various conditions is typically always present, and the device characterization models are not able to compensate for these part-to-part variations. As a consequence, using a fixed-compensation model to compensate for PD offsets results in both increased power inaccuracy and closed loop speed fluctuations that lead to output power ramping-related degradations. Additionally, these mathematical models for achieving PD offset compensation often lead to the disadvantage of design complexity.

FIGURES

Non-limiting and non-exhaustive embodiments of the present disclosure are described with reference to the following figures.

SUMMARY

In one embodiment of the disclosure, a method for performing self-calibration and compensation of a detector offset is provided. The method includes: identifying for a calibration flag; if the calibration flag is identified, transmitting a first signal; reading and accumulating detector codes in response to the first signal; and calculating a detector offset based on the detector codes.

In another embodiment of the present disclosure, an apparatus for performing self-calibration and compensation of a detector offset is provided. The apparatus includes a digitizer. The apparatus also includes a self-calibration module connected to the digitizer and for detecting for a calibration flag, for transmitting a first signal if the calibration flag is detected, for reading and accumulating detector codes in response to the first signal, and for calculating a detector offset based on the detector codes.

DETAILED DESCRIPTION

Reference will now be made in detail to embodiment(s) of the disclosure, an example(s) of which is (are) illustrated in the accompanying drawings. Wherever possible, the same reference numbers will be used throughout the drawings to refer to the same or like parts.

In the following detailed description, for purposes of explanation, numerous specific details are set forth to provide a thorough understanding of the various embodiments of the disclosure. Those of ordinary skill in the art will realize that these various embodiments of the disclosure are illustrative only and are not intended to be limiting in any way. Other embodiments of the disclosure will readily suggest themselves to such skilled persons having the benefit of this disclosure.

Figure 1:
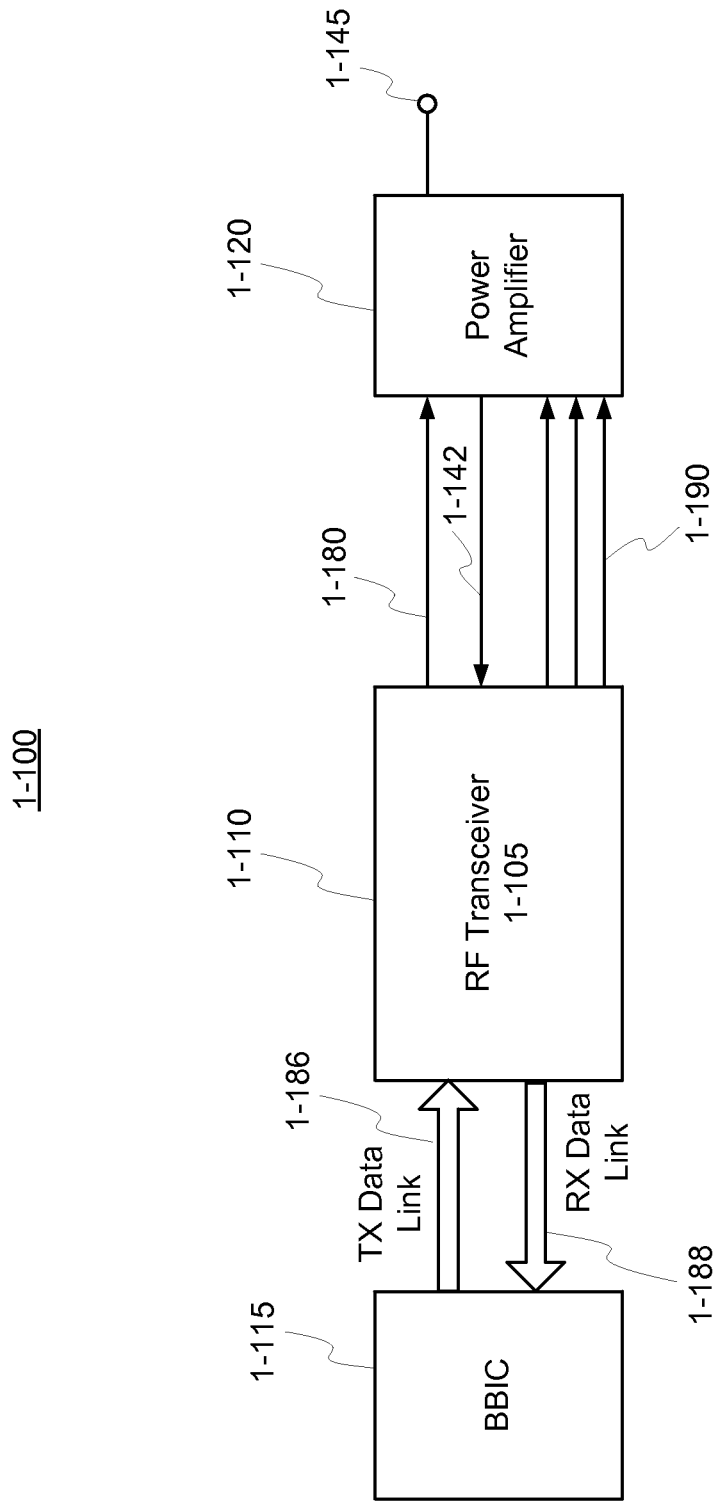
FIG. 1 is a block diagram of a system, in accordance with an embodiment of the present disclosure.

FIG. 1 is a block diagram of a system 1-100, in accordance with an embodiment of the present disclosure. The system includes a radio frequency (RF) transceiver 1-105 in a block 1-110, a block 1-115 which includes a Base Band Integrated Circuit (BBIC), and a block 1-120 which includes a power amplifier, as will be discussed further below. The block 1-110 provides a drive signal 1-180 for driving the block 1-120. An antenna 1-145 (connected to the block 1-120) transmits output RF signals for wireless communications.

As an example, the block 1-115 communicates with the block 1-110 via a transmit (TX) data link 1-186 and a receive (RX) data link 1-188. The block 1-110 also sends the power amplifier control signals 1-190 to the block 1-120. Various components in the block 1-110 perform a self-calibration and compensation of a detector offset that is detected via a power detector voltage 1-142 from the block 1-120, as will be discussed below in accordance with an embodiment of the disclosure.

Figure 2:
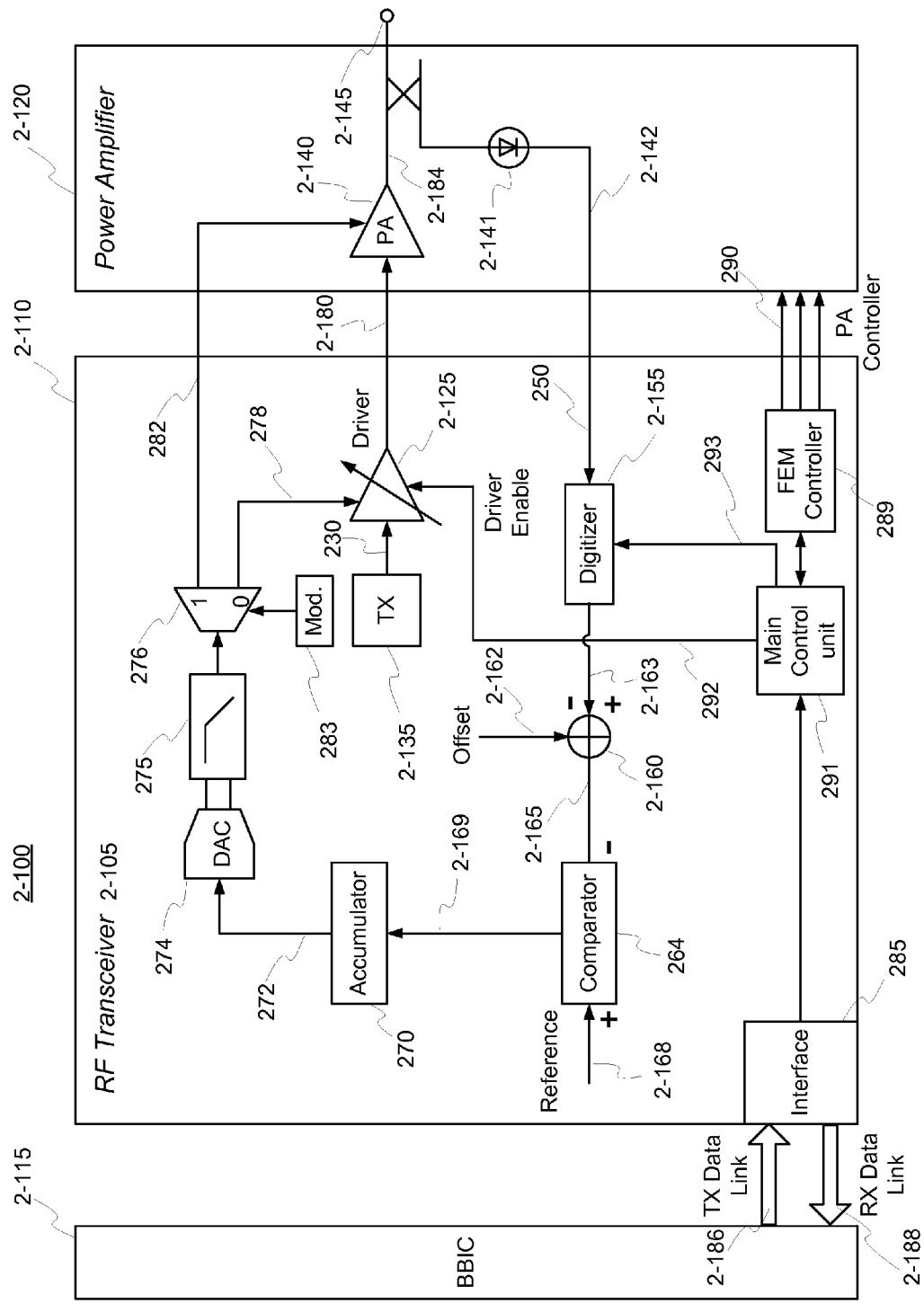
FIG. 2 is a block diagram of a power control loop in a radio frequency (RF) transceiver, in accordance with an embodiment of the present disclosure.

FIG. 2 is a block diagram of a power control loop 2-100 in a radio frequency (RF) transceiver 2-105, in accordance with an embodiment of the disclosure. The transceiver 2-105 is shown as included in a transceiver chip 2-110. The transceiver chip 2-110 is generally identified as the block 1-110 in FIG. 1. The transceiver chip 2-110 typically operates with a Base-Band Integrated Circuit (BBIC) 2-115 and a power amplifier chip 2-120. The BBIC 2-115 and power amplifier chip 2-120 are generally identified as the blocks 1-115 and 1-120, respectively, in FIG. 1. As will be discussed below, the transceiver 2-105 performs self-calibration of the PD offset and compensates the PD offset variation in a transmitter's real time operation across all conditions, in one embodiment of the present disclosure. However, the system and method, in accordance with embodiments of the present disclosure, may be used in other types of transceivers as well.

The power control loop 2-100 includes a driver 2-125 that increases the output power of an RF signal 230 from a transmitter 2-135. This output power (of the output RF signal 230) is amplified to the required level by the power amplifier (PA) 2-140. The PA 2-140 is included in the PA chip 2-120 or is integrated in the transceiver chip 2-110. The detector 2-141 will detect the voltage output of the PA 2-140 and generate a power detector voltage 2-142 which is received by the digitizer 2-155. The detector 2-141 can be internal to or external from the PA 2-140. An antenna 2-145 then transmits the output RF signal 230.

The power control loop 2-100 includes a feedback path 250 with a digitizer block 2-155. The digitizer block 2-155 typically includes a gain stage, and an analog-to-digital converter (ADC) connected to the gain stage.

The output of the digitizer 2-155 is connected to a voltage adder/subtractor 2-160 that adds or subtracts an offset calibration value 2-162 to the digitizer output 2-163. A comparator 264 compares the output voltage value 2-165 of the adder/subtractor 2-160 with a reference voltage 2-168 and then outputs an error signal 2-169 to an accumulator 270.

The accumulator 270 accumulates the error signal 2-169 within a given time period, calculates an average of the error signals 2-169 received during the given time period, and outputs the error signal 272. The accumulator 270 performs an averaging of the error signals 2-169 in order to filter out any noise from the digitizer 2-155 during the ADC process. The accumulator 270 transmits the averaged error signal 272 to the DAC 274.

The DAC 274 converts the digital error signal 272 into an analog signal and feeds the signal to the low pass filter 275. This low pass filter 275 is followed by a multiplexer (MUX) 276. One output 282 of the MUX 276 is routed to PA 2-140 and the second output 278 is routed to the driver 2-125. The selection of routing path is controlled by the block Mod 283 which is based on the mode of operation of PA 2-140. For example, in case of a fixed gain power amplifier, the path 278 is selected whereas for case of variable gain power amplifier, the path 282 at MUX 276 output is selected.

In one example, the BBIC 2-115 communicates with an interface 285 of the RF transceiver chip 2-110 via a transmit (TX) data link 2-186 and a receive (RX) data link 2-188. The chip 2-110 also includes a front-end module (FEM) controller 289 that sends PA control signals 290 to the PA chip 2-120.

A main control unit 291 communicates with the interface 285 and the controller 289. The main control unit 291 also transmits the control signals 292 and 293 to the driver 2-125 and the digitizer 2-155, respectively. The main control unit 291 also communicates with the interface 285. As will be discussed below, the main control unit 291 includes a module 305 (FIG. 3) for performing self-calibration and compensation of a PD offset voltage(s), in accordance with an embodiment of the present disclosure.

Figure 3:
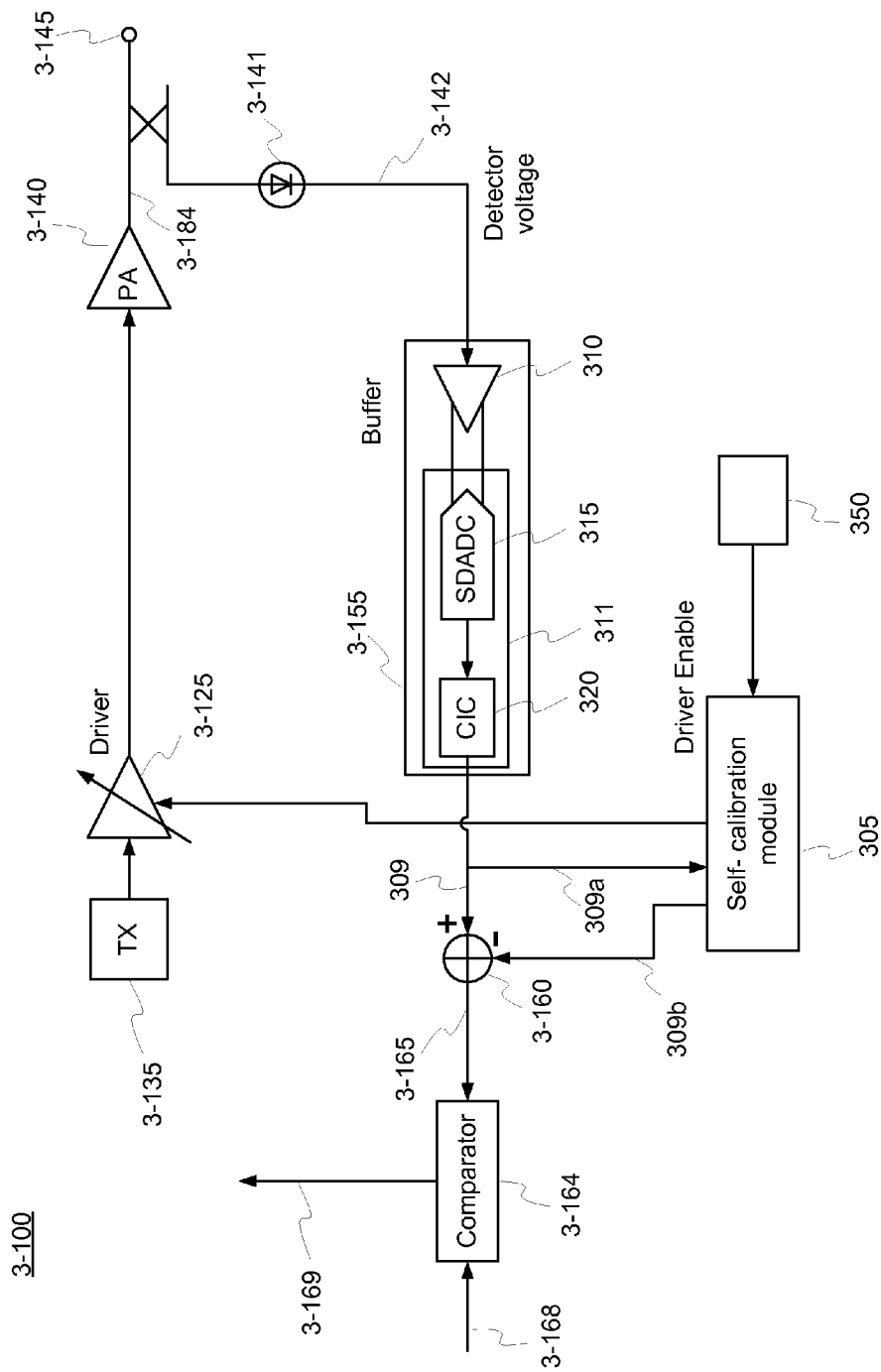
FIG. 3 is a block diagram of a module for performing self-calibration and compensation of detector offset in a transceiver control loop, in accordance with an embodiment of the present disclosure.

FIG. 3 is a block diagram that shows a power control loop 3-100 partially shown with a module 305 for performing self-calibration and compensation of a PD offset voltage (or voltages or digitized PD offset code), in accordance with an embodiment of the present disclosure. The self-calibration module 305 is connected to the feedback loop 3-100 via the digitized voltage adder/subtractor 3-160 and via the driver 3-125. In an embodiment of the present disclosure, the self-calibration module 305 is integrated in the main control unit 291 (FIG. 1) or is external to the main control unit 291 and is communicatively coupled to the main control unit 291.

In an embodiment of the present disclosure, the self-calibration module 305 provides two system aspects. In a first aspect, the self-calibration module 305 performs a self-calibration (automatic calibration) routine of the PD offset (PD offset voltage or code) without the requirement that the BBIC 2-115 (FIG. 2) interacts in this self-calibration routine and without the requirement that any external calibration routine interacts in this self-calibration routine. Therefore, this first system aspect reduces the factory calibration time per unit of devices (e.g., wireless phones), and allows the removal of the complex PD offset calibration routines presently used in the BBIC 2-115 in present technology.

In a second system aspect, the self-calibration module 305 tracks and compensates the PD offset (voltage or code) variations in a real time operation of the transmitter. The module 305 tracks and compensates the PD offset variations across all conditions that affect the transmitter 3-135 and/or transceiver chip 2-110 (FIG. 2). Such conditions that can affect the transmitter 3-135 and/or transceiver chip 2-110 can include, for example, temperature variations in the environment (e.g., phone package), battery voltage levels to a device with the transceiver chip 2-110, frequency variations, and/or other conditions. The module 305 compensates for the PD offset variations in a dynamic manner and in real time, as will be discussed further below.

The module 305 can re-calibrate for a PD offset if the phone is activated, if there is a new transmission that will take place on the phone, and/or for every pre-programmed time period occurrence. Therefore, the module 305 eliminates the need for complex and/or inaccurate compensation algorithms for such PD offset variations, and eliminates the need for the BBIC 2-115 to implement these algorithms.

In one example, the digitizer 3-155 (in the feedback path 3-100) includes a gain stage 310 and an ADC 311 that is connected to the gain stage 310. As an example, the ADC 311 includes a sigma delta ADC (SDADC) 315 that is connected to the gain stage 310, and a cascade integrator comb (CIC) filter 320 that is connected to the SDADC 315. The ADC 311 may be formed by other components in another embodiment. Any additional detector offset values generated by analog circuits in the digitizer 3-155 will be combined with the PD offset voltage and calibrated by the module 305.

Figure 4:
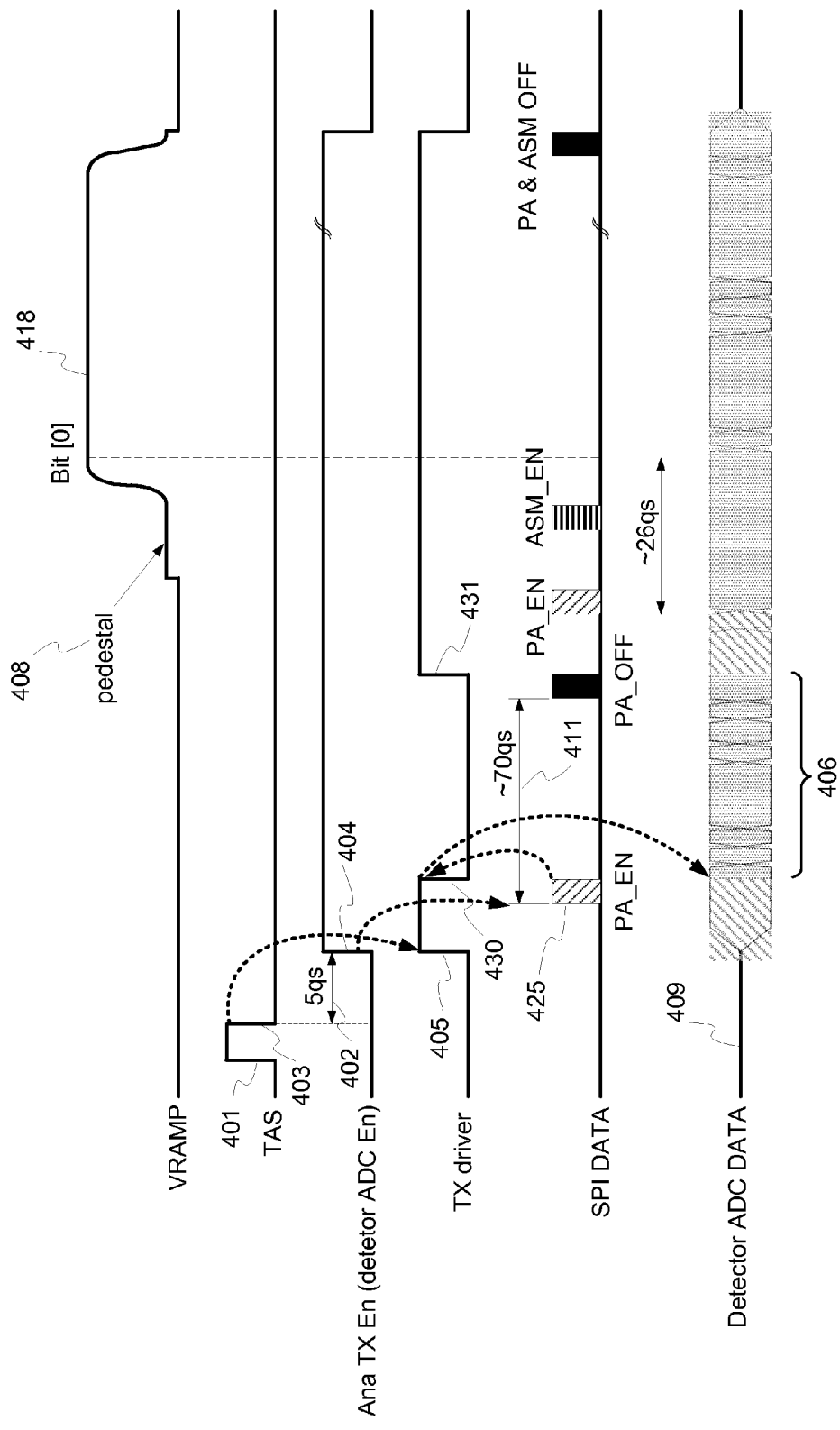
FIG. 4 illustrates timing diagrams of the PD offset self-calibration routine, in accordance with an embodiment of the present disclosure.

Reference is now made to FIG. 2, FIG. 3, and FIG. 4 for purposes of describing additional details on performing a PD offset self-calibration scheme and PD offset compensation, in accordance with an embodiment of the disclosure. FIG. 4 illustrates timing diagrams of the PD offset self-calibration routine. Although the timing diagrams include signals and timing sequences that are used in the GSM approach for wireless transmission, an embodiment of the PD offset self-calibration routine can be used in other standards or approaches for wireless transmission. GSM is a time-division duplexing (TDD) system which means the compensation of the power detector offset should be time aligned with other transmitter activities accordingly.

At the beginning of every transmit frame, the transceiver internal controller unit (shown as a main control unit 291 in FIG. 2) receives a time accurate strobe (TAS) pulse 401 (or strobe pulse 401) from the BBIC 2-115 (FIG. 2) via a Digital RF (DigRF) interface (shown as interface 285). The TAS pulse 401 initiates a transmit (TX) activation sequence and is used in DigRF specifications. The TAS pulse 401 occurs whenever a new transmit (TX) activation sequence is to occur.

Additionally, each mode of operation also has a dedicated TAS pulse and waveform signal. It is noted that the start of the transmit (TX) activation sequence as applied to an embodiment of the self-calibration module and routine is not limited to DigRF specifications and can be based on any type of triggering mechanism from the BBIC 2-115, where these triggering mechanisms start the transmit (TX) activation sequences in a transceiver.

After approximately 5 quarter symbols (≈4.6 µseconds) as shown in interval 402, the detector_ADC_En enable signal goes high. This interval 402 is between the falling edge 403 of the TAS pulse 401 and the rising edge 404 of the detector_ADC_En enable signal. This detector_ADC_En enable signal turns on the SDADC block 315 and CIC block 320 in the digitizer 3-155.

The self-calibration procedure is now described, in accordance with an embodiment of the present disclosure. The TX driver signal goes high as shown by the transmit (TX) driver pulse 405 and this TX driver pulse 405 will turn on the transmit (TX) driver 3-125 (FIG. 3). In order to measure the PD offset accurately, a measurement and PD offset calibration window 406 is created before pedestal 408 occurs in the Bit [0] of the VRAMP signal. The Bit [0] is the first data bit 418 of the GSM data transmission of an RF signal. The starting point of the closed loop operation is usually at a power level called pedestal (edge 408 in the VRAMP signal) which is at least about 4 dB to about 5 dB lower than the minimum power defined by the GSM standard. The PD offset calibration window 406 is shown in the Detector_ADC_data waveform which is the digitizer output digital signal (voltage codes) 309 of the digitizer 3-155. The self-calibration module 305 will read values of the digitizer output digital signal 309 during this calibration window 406.

From the time that the TAS pulse 401 occurs to the time that Bit [0] occurs is about 140 microseconds. Of this approximately 140 microseconds, about 20 micro-seconds is used for initiating the ramp up components, synthesizers and other components in the power control loop 3-100. Therefore, about 120 micro-seconds is available for self-calibration of PD offsets and PD offset compensations, in an embodiment of the present disclosure. Accordingly, in an embodiment of the disclosure, the calibration window 406 can be as long as 100 microseconds for the transceiver 2-105 to turn on the digitizer 3-155, for the module 305 to perform feedback sampling of the voltage codes 309 and calculations (averaging of the voltage codes 309), for the module 305 to perform the shutdown of the transmit (TX) driver 3-125, and for the transceiver 2-105 to proceed through normal operation. When the TX driver 3-125 is turned off, the PA 3-140 is at a minimum power and outputs a minimum voltage level. The 70 quarter symbol (in interval 411) is approximately 65 microseconds, and the module 305 reads the values voltage codes 309 during this interval 411 and calculates an average value of the voltage codes 309 from this interval 411. The module 305 reads the voltage codes 309a from the output voltage codes 309 of the digitizer 3-155. The module 305 calculates an average value 309b of the read voltage codes 309a during this interval 411. As shown in FIG. 4, this interval 411 is between the PA_EN pulse which turns on the PA 3-140 and the PA_OFF pulse which turns off the PA 3-140. In FIG. 4, the PA_EN and PA_OFF are shown in the SPI_DATA. When the TX_driver pulse 405 becomes low, the calibration window 306 initiates and the module 305 reads the voltage codes 309a from the digitizer 3-155.

For the purpose of creating the measurement and calibration window 406, the PA 3-140 is first turned on along with a detector 3-141 after the ADC 311 is enabled by the detector_ADC_En enable signal. As noted above, the detector 3-141 can be internal to or external from the PA 3-140.

A time amount (in the order of about 20 µsec) is allocated for the warm-up of the pre-ADC (gain) block 310 and the ADC 311. At this stage, the controller unit 291 (FIG. 2) is receiving a peripheral interface interrupt (in this example, SPI interrupt) from the front-end module (FEM) controller unit 289.

In order to filter out any noise of the ADC process, the module 305 performs the averaging of read ADC codes 309a, in accordance with an embodiment of the invention. The module 305 accumulates the read ADC codes 309a over the measurement interval 411, and calculates an average of these ADC codes 309a during the calibration window 406 time frame.

The module 305 outputs the calculated average voltage code 309b to the voltage adder/subtracter 3-160. The comparator 3-164 compares a reference signal 3-168 with a re-calibration signal 3-165 from the adder/subtractor 3-160. The re-calibration signal 3-165 is based on the average value 309b. The output of the comparator 3-169 is used to perform closed loop operation as similarly discussed above.

At the end of the calibration window 406, the module 305 has already obtained the PD offset value 3-142 (and has calculated the corresponding average value 309b). The module 305 turns off the PA 3-140 and the detector 3-141. The normal transmit (TX) activation procedure continues forward at this point and the closed loop is initiated with the newly-obtained calibrated offset 309b. Other signals used in a transmit activation procedure are shown by, for example, the pulses ASM_EN and PA&ASM_OFF.

The GSM standard specifies the maximum RF output leakage levels prior to the beginning 418 (Bit [0]) of the transmit slots. In order to meet these requirements in the GSM standard, and avoid unwanted leakage at the output of the PA 3-140 during the calibration window 406, the controller unit 305 temporarily turns off the pre-PA (TX) driver 3-125. The low value (low pulse 430 or first signal 430) of the TX_driver waveform temporarily turns off the TX driver 3-125 during this time segment within the calibration window 406. In order to reduce the current consumption of the PA 3-140 during the calibration window 406, the PA 3-140 is, for example, programmed for a minimum gain mode that allows meeting the GSM residual power suppression requirement. The TX_driver waveform then goes to a high value 431 (high pulse 431 or second signal 431) to turn on the TX driver 3-125 after the expiration of the calibration window 406 and prior to the transmission of Bit [0] which is the first data bit 418 of the GSM data transmission of an RF signal.

During the calibration window 406 when voltage measurements of the PA 3-140 are performed, the PA 3-140 bias is zero and the TX driver 3-125 is off. Therefore, the output power of the PA 3-140 will be very low and the detector voltage 3-142 at the output of the detector 3-141 will be effectively the PD offset (PD offset voltage). The accuracy of the PD offset calibration depends on the number of samples of voltage codes 309a that are averaged by the module 305 over the calibration window 406. Since the calibration of PD offset is performed prior to the beginning of every first slot 418 (Bit [0]), any change in the PD offset voltage due to, for example, temperature variations, voltage variations, aging, and frequency variations of the transceiver 2-105 (FIG. 2) will be automatically calibrated by the module 305. As a result, the module 305 alleviates the need for separate compensation schemes, mechanisms, and/or algorithms inside the RFIC 2-110 and/or BBIC 2-115.

In an embodiment, the module 305 has the flexibility to repeat the self-calibration of the PD offset and compensation of the PD offset in every frame, or with a longer period in order to track any slow PD offset variations. For example, when the temperature is not varying rapidly and/or is remaining relatively constant in the transceiver, the module 305 can be programmed (via programmed code 350) to repeat the PD offset self-calibration and PD offset compensation with a longer period and not in every frame.

The module 305 (FIG. 3) permits a fully-autonomous or automated approach for calibration (e.g., self-calibration, automatic or automated calibration, and/or programmable calibration) of PD offsets in a closed loop power systems. The module 305 can be integrated in or self-contained in, for example, the RF transceiver chip 2-110 (FIG. 2). In an embodiment, the module 305 is used in any RF transceivers or transmitters that support GSM technology including GPRS (General packet radio service), EDGE, EGPRS2 (enhanced GPRS2) modes. In another embodiment, the module 305 is used in a transmitter that is based on another wireless technology standard.

The capability of the module 305 to perform self-calibration alleviates several bottlenecks and disadvantages in GSM power control techniques and improves the overall system performance by providing a dynamic calibration of the PD offset. The capability of the module 305 to perform self-calibration also reduces the factory calibration time of cellular devices and also reduces the design complexities due to the integration or interface of current PD offset correction compensation models and sub-systems in wireless communication devices.

The module 305 performs PD offset self-calibration by tracking and correcting PD offset variations over extreme conditions and/or varying conditions. The module 305 provides an approach that advantageously eliminates the design complexities of current compensation algorithms inside the BBIC 2-115. The module 305 also advantageously eliminates the current requirement of performing time consuming device characterization processes for building PD compensation models during the wireless device development phase.

An embodiment of the present disclosure provides a module 305 and/or method 500 for self-calibration and compensation of a power detector (PD) offset in the feedback path of closed loop transmitter power control. This module 305 and/or method 500 provides a more accurate approach to calibration and compensation of the PD offset. The module 305 and/or method 500 can be used in GPRS and EGPRS cellular applications and in other specifications.

Additionally, an embodiment of the present disclosure allows the calibrations to take place in such a manner that does not rely on specific transmitter architecture or phone's power amplifier (PA) and front-end connectivity. Additionally, an embodiment of the present disclosure can be adopted in any existing GSM design regardless of transceiver architecture. An embodiment of the present disclosure also does not rely on the currently-used characterization model and is thus not sensitive to any part to part variation.

Other possible advantages are achieved by embodiments of the disclosure where self-calibration and/or compensation are applied to PD offsets.

Figure 5:
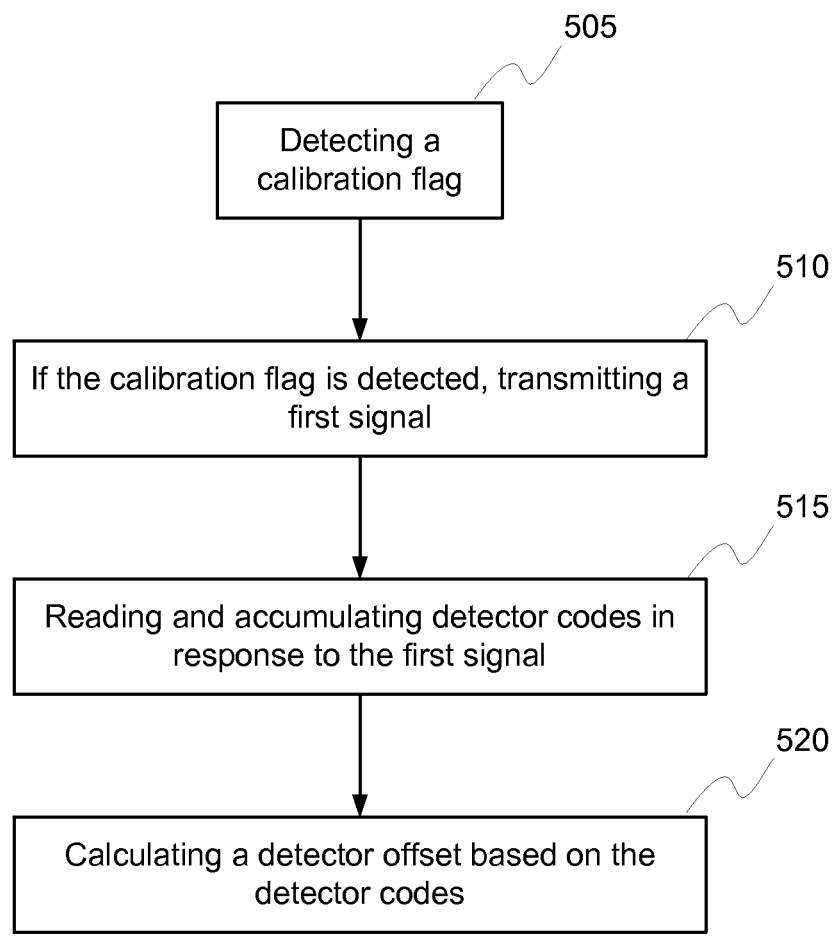
FIG. 5 is a flowchart of a method, in accordance with an embodiment of the present disclosure.

FIG. 5 is a flowchart of a method 500, in accordance with an embodiment of the present disclosure. At 505, the method 500 detects for a calibration flag. The calibration flag may be used to indicate that an offset value for a detector, e.g., the detector 2-141, is to be calculated. At 510, the method transmits a first signal if the calibration flag is detected. The first signal may be used to turn off the driver, e.g., the driver 2-125. At 515, the method 500 reads and accumulates detector codes in response to the first signal. At 520, the method 500 calculates a detector offset based on the detector codes. In an embodiment, prior to calculating the detector offset, the method may transmit a second signal that is used to turn off the power amplifier, e.g., the PA 2-140, after an expiration of a measurement interval in a calibration window.

Figure 6:
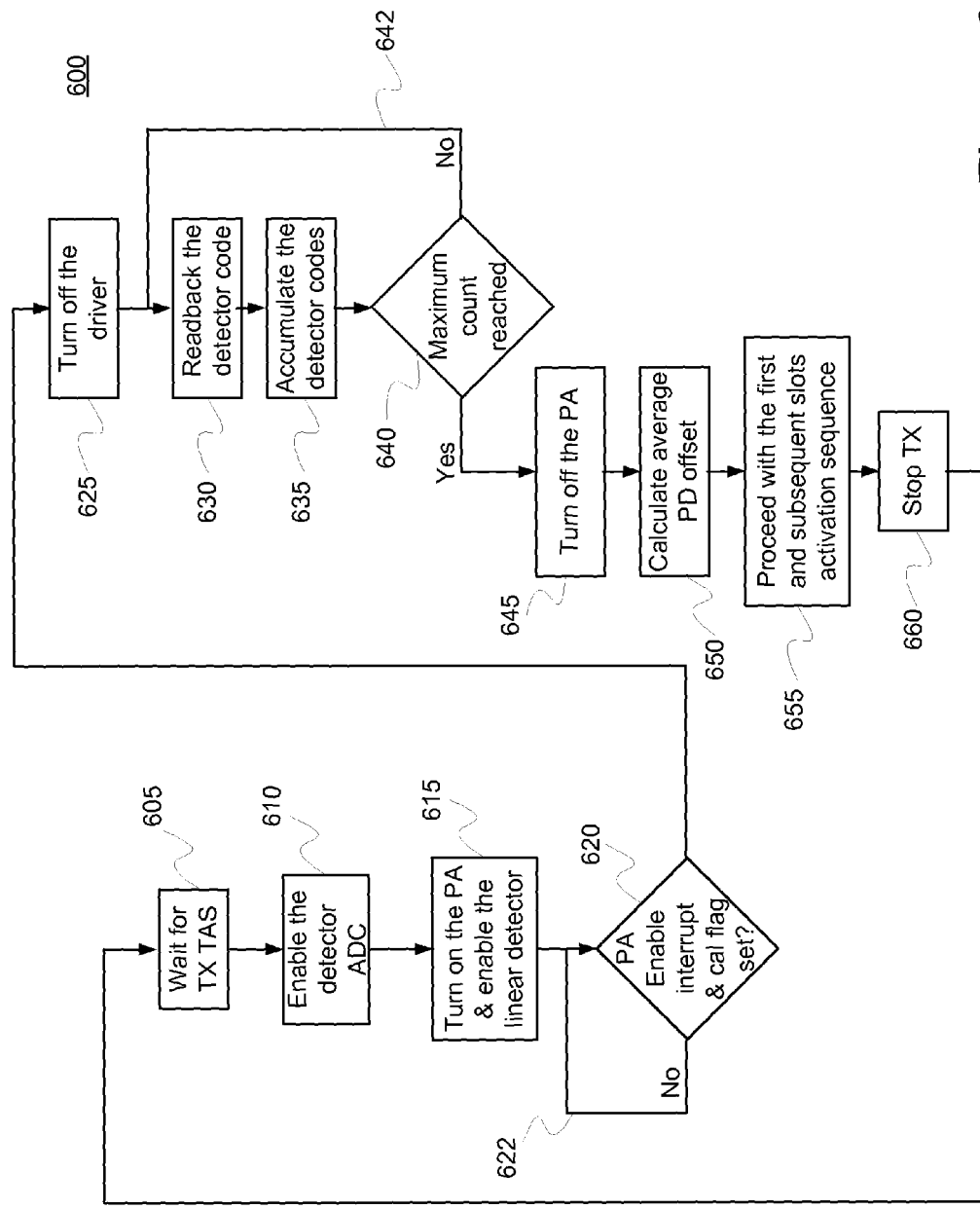
FIG. 6 is a flowchart of a method for a PD offset self-calibration scheme, in accordance with an embodiment of the present disclosure.

FIG. 6 is a flowchart of a method 600 for a PD offset self-calibration scheme, in accordance with an embodiment of the disclosure. In the method 600, the self-calibration module 305 (FIG. 3) performs the various sequences in FIG. 6 unless otherwise specified.

At 605, the method 600 waits (detects) for a transmission of a TAS pulse in the transmit (TX) activation sequence. At 610, the method 600 turns on (or enables) the detector ADC 311 (FIG. 3) when the detector_ADC_En (FIG. 4) goes high. At 610, the method 600 turns on the PA 3-140 and enables the linear detector 3-141 (FIG. 3) when the TX driver signal goes high.

At 620, the method 600 determines if the PA Enable interrupt and calibration flag 425 (FIG. 4) is set (high). If not, the method 600 executes the feedback loop 622 and the method 600 proceeds as follows. At 620, the method 600 again waits for the flag 425 to become set (high).

At 620, if the flag 425 is set, the method 600 proceeds as follows. At 625, the method 600 turns off the driver 3-125 (FIG. 3). The driver 3-125 can be turned off because RF signals are not currently transmitted to the driver.

At 630, the method 600 reads back the detector codes 309a (FIG. 3) from the digitizer 3-155. Currently, there is no transmission occurring from the antenna 3-145 (FIG. 3). At 635, the method 600 accumulates the detector codes 309a that are read from the digitizer 3-155. In an embodiment of the present disclosure, the module 305 (FIG. 3) reads and accumulates the detector codes 309a within the measurement interval 411 (FIG. 4) such as, for example, about 70 micro-seconds.

At 640, the method 640 checks if the maximum count is reached for the detector codes 309a that are read. The maximum count is defined by, for example, the measurement interval 411 in the calibration window 406. The method 600 continues to read and accumulate the detector codes 309a if the measurement interval 411 (e.g., about 70 micro-seconds) has not expired. If the maximum count has not yet been reached (e.g., the measurement interval 411 has not expired), then the method 600 executes the feedback loop 642, and the method 600 proceeds as follows. At 630, the method 600 continues to read back the detector code 309a as similarly discussed above.

At 645, the method 600 turns off the PA 3-140. At 645, the module 305 makes the TX_driver to go from the high pulse 405 (high transmit driver pulse 405) to the low pulse 430 (low transmit driver pulse 430). At this part of the self-calibration routine, the method 600 has already accumulated a sufficient number (or a given plurality) of detector codes 309a in order to calculate an average value 309b of the detector codes 309a. This average value 309b of the detector codes 309a corresponds to an average PD offset.

At 650, the method 600 calculates the average PD offset. This average PD offset is the average value 309b of the detector codes 309a.

A detector code 309 (FIG. 3) is digitized value of the DC detector voltage 3-142 that is output from the detector 3-141 and that is generated by the digitizer 3-155. The detector 3-141 is, for example, a linear envelope detector that detects a time varying envelope that is transmitted as the RF signal from the antenna 3-145 (FIG. 3). The PD offset is performed by calculating the average value 309b of the detector codes 309a as read by the module 305.

At 655, the method 600 proceeds with the first transmission slot 418 (FIG. 4) and subsequent slots in the transmit (TX) activation sequence. At 660, the transmit (TX) activation sequence stops when the transmission has finished.

The method 600 then proceeds as follows. The method again waits for another TAS pulse in the transmit (TX) activation sequence. The new TAS pulse indicates a new operation sequence in the transceiver 2-110 (FIG. 2).

As similarly mentioned above, the PD offset self-calibration in an embodiment of the disclosure can similarly provide the closed loop power control performance stability under other conditions such as variation of supply voltages, frequency, and aging.

Other variations and modifications of the above-described embodiments and methods are possible in light of the teaching discussed herein.

It is also within the scope of the disclosure to implement a program or code that can be stored in a machine-readable or computer-readable medium to permit a computer to perform any of the techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the disclosure, including what is described in the Abstract, is not intended to be exhaustive or to limit the invention to the precise forms disclosed. While specific embodiments of, and examples for, the embodiments are described herein for illustrative purposes, various equivalent modifications are possible within the scope of the disclosure, as those skilled in the relevant art will recognize.

These modifications can be made to the embodiments in light of the above detailed description. The terms used in the following claims should not be construed to limit the invention to the specific embodiments disclosed in the specification and the claims. Rather, the scope of the disclosure is to be determined entirely by the following claims, which are to be construed in accordance with established doctrines of claim interpretation.

What is claimed is:

1. A method comprising:
   generating an output signal by a power amplifier;
   detecting, by a power detector, the output signal to generate a detector voltage;
   digitizing the detector voltage to generate detector codes by a digitizer;
   receiving an input signal;
   detecting a calibration flag included in the input signal;
   generating the output signal using a first signal provided by a self-calibration module when the calibration flag is detected;
   reading and accumulating the detector codes in response to the first signal and calculating an offset of the power detector based on the detector codes during a measurement interval in a calibration window; and
   turning off the power amplifier by transmitting a second signal in response to an expiration of the measurement interval in the calibration window.

2. The method of claim 1, further comprising:
   using an average of the detector codes to calibrate the offset of the power detector.

3. The method of claim 1, further comprising:
   detecting for a strobe pulse that initiates a transmit activation sequence.

4. The method of claim 3, further comprising:
   enabling the digitizer in a power control loop after detecting the strobe pulse.

5. The method of claim 1, further comprising:
during the measurement interval in the calibration window, turning off a transmit driver and turning on the power amplifier and the power detector that detects the offset of the power detector,
wherein an output of the transmit driver is connected to an input of the power amplifier, and an output of the power amplifier is coupled to an input of the power detector.

6. The method of claim 1, wherein reading and accumulating the detector codes occurs when the output signal is not being transmitted.

7. The method of claim 1, wherein calculating the offset of the power detector is performed within the calibration window, which is prior to an RF data transmission.

8. The method of claim 1, further comprising:
calculating an average of the detector codes during a pre-programmed time period.

9. The method of claim 1, wherein the power detector detects a time varying envelope of the output signal.

10. The method of claim 1, wherein the input signal is a Serial Peripheral Interface (SPI) data signal, and the calibration flag is a pulse in the SPI data signal.

11. An apparatus comprising:
a power amplifier to generate an output signal;
a power detector to detect the power signal to generate a detector voltage;
a digitizer connected to the power detector, the digitizer to digitize the detector voltage and generate detector codes; and
a self-calibration module connected to the digitizer and to receive an input signal, detect a calibration flag included in the input signal, to transmit a first signal when the calibration flag is detected, to read and accumulate during a measurement interval in a calibration window the detector codes in response to the first signal, to calculate an offset of the power detector based on the detector codes, and to turn off the power amplifier by transmitting a second signal in response to an expiration of the measurement interval in the calibration window.

12. The apparatus of claim 11, wherein the self-calibration module uses an average of the detector codes to calibrate the offset of the power detector.

13. The apparatus of claim 11, wherein the self-calibration module detects a strobe pulse that initiates a transmit activation sequence.

14. The apparatus of claim 13, wherein the self-calibration module enables the digitizer in a power control loop after detecting the strobe pulse.

15. The apparatus of claim 11, further comprising a transmit driver, an output of the transmit driver being connected to an input of the power amplifier, an output of the power amplifier being coupled to an input of the power detector,
wherein, during the measurement interval in the calibration window, the self-calibration module turns off the transmit driver, and turns on the power amplifier and the power detector that detects the offset of the power detector.

16. The apparatus of claim 13, wherein the self-calibration module reads and accumulates the detector codes when the output signal is not being transmitted.

17. The apparatus of claim 11, wherein the self-calibration module calculates an average of the detector codes within the calibration window, which is prior to an RF data transmission.

18. The apparatus of claim 11, wherein the self-calibration module calculates an average of the detector codes during a pre-programmed time period.

19. The apparatus of claim 11, wherein the digitizer includes an analog-to-digital converter, and
wherein the power detector includes a linear envelope detector that detects a time varying envelope of the output signal.

20. The apparatus of claim 11, wherein the input signal is a Serial Peripheral Interface (SPI) data signal, and the calibration flag is a pulse in the SPI data signal.

* * * * *